(12) United States Patent
Leviton

(10) Patent No.: US 7,924,415 B2
(45) Date of Patent: Apr. 12, 2011

(54) APPARATUS AND METHOD FOR A LIGHT DIRECTION SENSOR

(75) Inventor: Douglas B. Leviton, Boulder, CO (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 179 days.

(21) Appl. No.: 12/389,097

(22) Filed: Feb. 19, 2009

(65) Prior Publication Data

US 2010/0208245 A1 Aug. 19, 2010

(51) Int. Cl.
*G01C 1/00* (2006.01)
(52) U.S. Cl. .................................. 356/139.02
(58) Field of Classification Search ............. 356/139.02, 356/139.1–141.5
See application file for complete search history.

(56) References Cited

U.S. PATENT DOCUMENTS

| 3,435,246 | A | * | 3/1969 | Mildice | 250/237 R |
| 5,428,215 | A | * | 6/1995 | Dubois et al. | 250/206.2 |
| 5,483,060 | A | * | 1/1996 | Sugiura et al. | 250/237 R |
| 5,604,695 | A | * | 2/1997 | Cantin et al. | 356/121 |
| 5,615,006 | A | * | 3/1997 | Hirukawa et al. | 356/124 |
| 5,757,478 | A | * | 5/1998 | Ma | 356/141.2 |
| 6,274,862 | B1 | * | 8/2001 | Rieger | 250/216 |
| 7,161,686 | B2 | * | 1/2007 | Duling et al. | 356/614 |
| 2009/0297058 | A1 | * | 12/2009 | Hoctor et al. | 382/274 |

* cited by examiner

*Primary Examiner* — Isam Alsomiri
(74) *Attorney, Agent, or Firm* — Chistopher O. Edwards

(57) ABSTRACT

The present invention provides a light direction sensor for determining the direction of a light source. The system includes an image sensor; a spacer attached to the image sensor, and a pattern mask attached to said spacer. The pattern mask has a slit pattern that as light passes through the slit pattern it casts a diffraction pattern onto the image sensor. The method operates by receiving a beam of light onto a patterned mask, wherein the patterned mask as a plurality of a slit segments. Then, diffusing the beam of light onto an image sensor and determining the direction of the light source.

11 Claims, 11 Drawing Sheets

APPARATUS AND METHOD FOR A LIGHT DIRECTION SENSOR

STATEMENT REGARDING FEDERALLY SPONSORED RESEARCH OR DEVELOPMENT

The invention described herein was made by an employee of the United States government, and may be manufactured and used by or for the government for any governmental purposes without payment of any royalties thereon or therefore.

TECHNICAL FIELD

The present invention relates to an apparatus and method for sun sensors and in particularly, to sun sensors utilizing a patterned mask that has a plurality of slits.

BACKGROUND OF THE INVENTION

A sun angle sensor, or simply sun sensor, is an opto-electronic device used to detect the direction from which sunlight arrives. It has always and continues to be a commonly used navigational or attitude control device for both NASA and commercial spacecraft. It can also be used, for example, on robotic rovers or other payloads performing Lunar and Martian surface exploration for sun-position based navigation and for solar attitude monitoring to help maintain robot and/or payload safety during operations.

A conventional, single-axis sun sensor has a pair of adjacent photodiode detectors behind a slit where the edge of adjacency of the detectors is somewhat inclined to the direction of the slit. When the sensor is pointed directly at the sun, the same amount of light falls on each photo detector and their analog outputs are matched. When the direction of sunlight is off-axis in azimuth only, the detector outputs are imbalanced in a relative sense indicative of the direction and amount of azimuthal offset.

Meanwhile, directional offset in elevation only also produces signal imbalance albeit at a rate which is less than in azimuth. The imbalance from a single such sensor is therefore ambiguous with regard to size and direction of off-axis direction of sunlight. Following a substantial amount of calibration, processing signals from two orthogonally disposed, conventional single-axis sun sensors resolves the mutual ambiguities in azimuth and elevation signals and permits correct, if not particularly sensitive or stable, determinations of the sun angles. Some sun sensor models have performance as good as +/−64 deg field of regard at 0.25 deg resolution and +/−32 deg field of regard at 0.1 deg resolution, limited in part by electronic drifts in the photodiodes' amplifier circuitry.

Aside from the technical demerits of poor resolution, unaxiality, axial crosstalk from orthogonal axes, large size, and high power and cost of conventional sun sensors, there are only one or two US vendors of sun sensors, and the going rate for one single-axis device is about $300 K. Multiple single-axis sensors deployed precisely orthogonally are required on each face of a spacecraft to determine sun angle in both azimuth and elevation.

Additional sensors are sometimes required to determine spacecraft roll angle with respect to the sun-spacecraft vector. Typical deployments use two or three sensors on at least three spacecraft faces. Each sensor package comprises a sensor head about the size of a Post-it note pad and an accompanying electronics box about the size of a brick.

Thus it would be advantageous to have a sun sensor that has higher sensitivity and no drift.

SUMMARY OF THE INVENTION

Embodiments of the present invention provide a system and method for determining the direction of a light source. Briefly described, in architecture, one embodiment of the system, among others, can be implemented as follows. The system includes an image sensor; a spacer attached to said image sensor, and a pattern mask attached to said spacer. The pattern mask has a slit pattern that as light passes through the slit pattern it casts a diffraction pattern onto the image sensor.

Embodiment of the present invention can also be viewed as providing methods for determining the direction of a light source. In this regard, one embodiment of such a method, among others, can be broadly summarized by the following steps. The method operates by receiving a beam of light onto a patterned mask, wherein said patterned mask as a plurality of a slit segments. Then, diffusing the beam of light onto a image sensor, and determining the direction of the light source.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
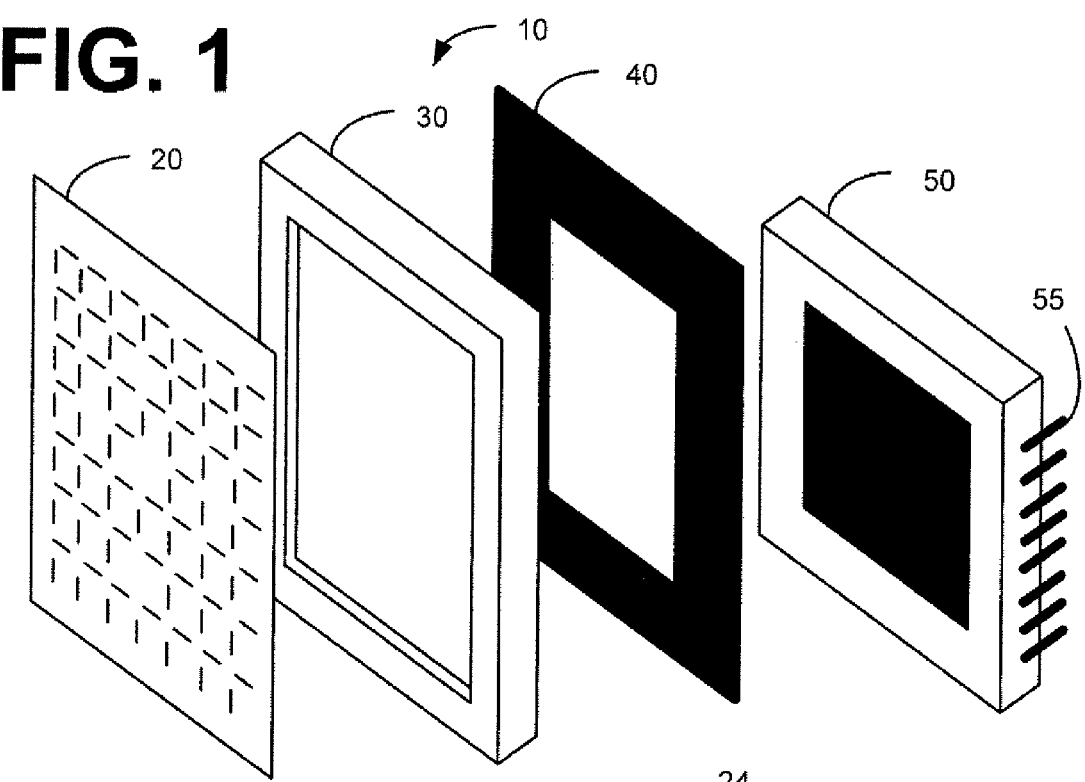
FIG. 1 is a block diagram illustrating a perspective view of the light direction sensor of the present invention.

The light direction sensor of the present invention provides one to two orders of magnitude more accuracy and sensitivity than conventional devices and does not drift. It produces orthogonal, bi-axial output without calibration. It is intrinsically cheaper and reduces the number of sensors needed in a typical spacecraft sun sensor application. In more general applications, the light direction sensor can be used for establishing lines of sight between two objects and is applicable to spacecraft navigation, formation flying in space, space beacons, and automotive collision avoidance.

The details described hereafter are generalized to a light source other than the sun. The light direction sensor applies equally well to the Moon, for example. Or, if disposed on the surface of the Moon, it applies equally well to the Earth or Sun. The layout details of mask features, the selection of an image sensor, and the arrangement of the mask with respect to the image sensor are all tailorable to numerous other light direction sensing applications. Examples include, but are not limited to measuring the vector direction connecting any two objects. Such as, one spacecraft having a beacon light source mounted to it to another having the disclosed light direction sensor mounted to it, or for determining the direction of travel of an automobile whose headlights are turned on traveling toward another which possesses this light direction sensor.

The light direction sensor of the present invention is based on a patterned mask, an area array image sensor, and a proven image processing algorithm. In the light direction sensor, a perforated mask containing a grid of slit segments arranged in a Cartesian fashion is placed just in front of a radiation-hard, image sensor having familiar rows and columns of pixels with some gap between the mask and the image sensor. It is understood that there are nearly infinite number of different patterns of slit segments from which advantage can be gained depending on requirements of a given light direction sensor application.

When illuminated by a beam of light, each slit segment creates its own single slit, Fresnel or Fruanhofer diffraction pattern or simply a shadow of itself on the image sensor. Slit segments are arranged such that the patterns they produce on the image sensor do not influence each other. Based on geometry of similar triangles, the position of the ensemble of diffraction patterns absolutely defines the direction from which sunlight passing through the mask is coming.

A simple image process computes that direction based on the image data from those patterns and knowledge of the details of the mask and the arrangement of the mask with respect to the image sensor itself. The mask pattern is constructed such that the image process can unambiguously determine not only truly orthogonal sun azimuth and elevation angles, but also roll angle of the sun-to-sensor-axis vector with a single light direction sensor.

For most deployment situations, an enormous cost savings could be realized in a very simple, robust, compact, and low cost package. Furthermore, the angular resolution of the light direction sensor will be as much as 100 times higher than that of conventional sensors with a comparable field of regard and with no drift.

The light direction sensor is a complete departure from conventional sun angle sensing techniques. The resulting resolution and stability arc at the 0.002 degree level compared to 0.2 deg for the best conventional sensor. This means that the light direction sensor of the present invention could replace existing sensors as well as other co-deployed sub-systems on many spacecrafts which are responsible for attitude control at such low levels. The light direction sensor provides unambiguous, roll-corrected sun angle with very high orthogonality in azimuth and elevation, which means that only a few sensors per spacecraft might be needed instead of as many as a dozen.

FIG. 1 is a block diagram illustrating a perspective view of the light direction sensor 10 of the present invention. The light direction sensor 10 comprises of four main parts (L to R): a specially patterned mask 20 whose design is extremely flexible (grid-like item), a high stability spacer 30, an interface substrate 40, and an electronic area array image sensor 50 with pins 55. In operation, light enters from the hemisphere to the left of the patterned mask 20 at some angle from the normal to the light direction sensor 10, limited by the design field of view (FOV) of the device.

The patterned mask 20 has a slit pattern in front of the image sensor 50 at a known gap provided by the high stability spacer 30. As light passes through the slits the light casts a diffraction pattern on the image sensor 50. The shape and position of this diffraction pattern indicates the direction of the light.

Figure 2:
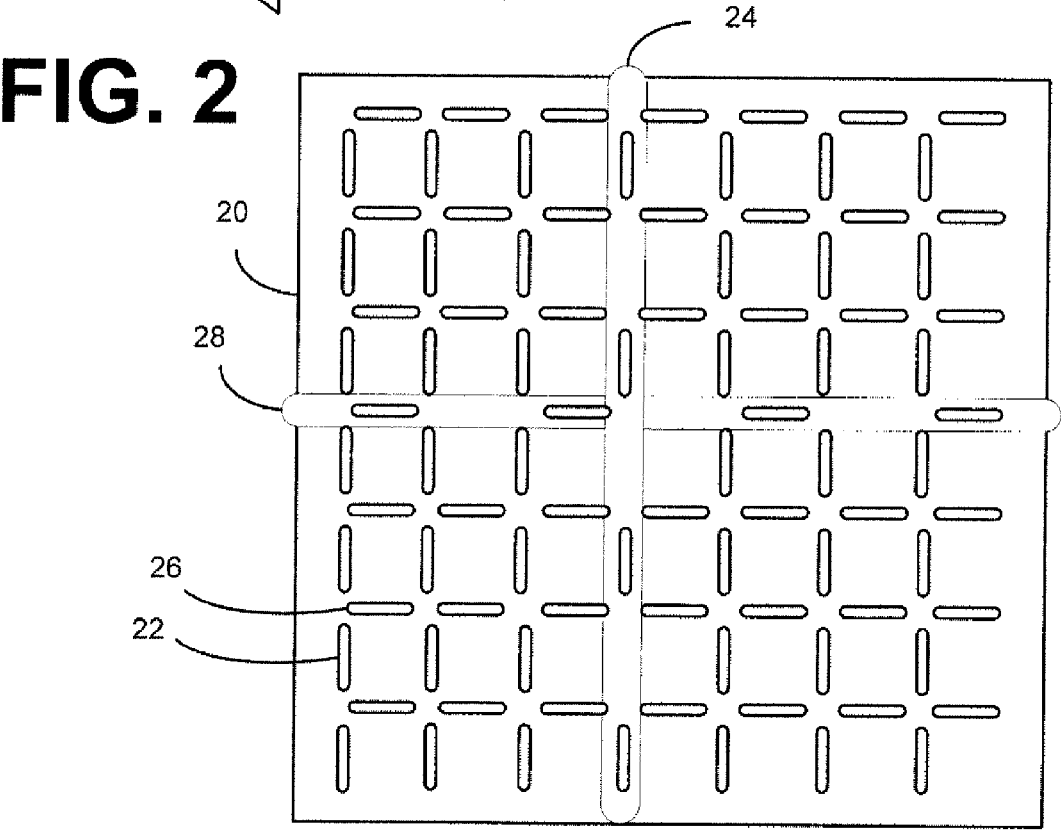
FIG. 2 is an example of a block diagram of pattern mask utilized in the light direction sensor as shown in FIG. 1.

One slit could be sufficient to calculate the direction of the light source. However, the fraction pattern from a slit is small enough that one can place several slits adjacent to one another on the patterned mask 20, where each will throw a separate, identical diffraction pattern on the image sensor 50. This enables the image sensor 50 to take multiple measurements to increase the precision. In order to calculate the light source vector, the light direction sensor 10 needs to know which diffraction pattern came from which slit, so the slits need to be identified. This is accomplished by intentionally dimming the light from some slits in an unambiguous way as shown in FIG. 2.

Other image sensor-based Sun sensors use only a single aperture, the pattern from which behaves similarly to each slit segment in the light direction sensor 10. However, because the light direction sensor 10 has a multiplet of apertures which create patterns on the image sensor 50 which do not interfere with one another. Effectively, many measurements of the light source (i.e. the Sun) position in the sky can be made with each exposure, instead of just a single measurement as with single aperture devices.

At any given distance from a light source (i.e. the Sun, moon or other celestial body) many more photons strike the image sensor 50 in the light direction sensor 10 than in a single aperture device. With that comes a commensurate increase in measurement certainty and angular resolution from the light direction sensor 10. Conversely, on that same statistical basis, the light direction sensor 10 can achieve similar resolution to single aperture devices at distances from a light source which is far greater, in the ratio of the square root of the relative area of openings in its slit mask compared to the area of the aperture in single aperture devices. This allows the light direction sensor 10 to be used on spacecraft much farther out in the solar system than current sensors.

Assuming exposure conditions which provide image signal near digital saturation of the light direction sensor 10, the achievable angular resolution of the light direction sensor can be easily calculated with absolute optical encoders. These optical encoders rely on processing of images of slits in patterned glass scales and on an understanding of the simple geometry of the light direction sensor's anatomy (distance from mask to image sensor), its patterned mask 20 layout (pitch of slits), and digitization performance and pixel format of its image sensor 50 (number and size of pixels.

For a given noise performance in an image sensor 50, the position resolution (in terms of the sensor's pixel dimension) for the one-dimensional image centroid along the row direction for a slit image (assumed to be oriented along pixel columns) whose integrated distribution even remotely resembles a Gaussian is well-known to be inversely proportional to the square root of the integrated image signal (measured in digital numbers DN) in the peak column. For a uniformly illuminated slit image whose peak pixel brightness is near digital saturation, that number can be approximated by the number of pixels along a column times 2 raised to the number of bits of image digitization.

As an example, pattern recognition can be accomplished by employing a Texas Instruments TC211 CCD image sensor as image sensor 50 and using an 8 bit A/D converter. This will achieve image centroid resolutions of 0.005 pixels with 120 rows of pixels contributing to the integrated image distribution whose peak is about 31,000 DN.

With patterned mask 20 and using a modern CMOS active pixel sensor, as image sensor 50, with of order 1024 rows and columns of pixels (of which about 800 would contribute to the integrated image distribution) employing a 10 bit AVD converter, the peak image brightness would be approximately $800 \times 2^{10}$ or about −800,000. So, single slit image centroid resolutions of 0.005 pixels/SQRT (800,000/31,000) or −0.001 pixels are routinely achievable with the light direction sensor 10 of the present invention.

Further, effective resolution goes inversely with the square root of the number of slit images present on the image sensor 50. With a patterned mask 20 design which permits as many as 20 slit image distributions to appear on the detector in each direction (slit images separated by about 50 columns), resolution will improve by the square root of 20 or 4.5 for an effective measurement resolution of about 0.00022 pixels.

Now, the angular subtense of a pixel seen at a distance is determined. The angular subsense is the separation between the patterned mask 20 and the image sensor 50. Assuming a CMOS image sensor with pixel dimensions of 5 microns as image sensor 50. Then assuming a separation between the patterned mask 20 and image sensor 50 of 3 mm, a pixel subtends an angle of only 0.0017 radians and so the anticipated on axis angular resolution of the light direction sensor 10 would be as low as 0.0017 radians/pixel×0.00022 pixels which is roughly $4 \times 10^{-7}$ radians or about 0.08 arc seconds.

FIG. 2 is an example of a block diagram of patterned mask 20 utilized in the light direction sensor 10 as shown in FIG. 1. As shown, the patterned mask 20 is something like a perforated metal foil where the perforated apertures cast "bright shadows" (shadowgrams—hereafter simply "shadows") of themselves on the image sensor 50 at positions given by the vector to the light source (not shown) with respect to the normal to the patterned mask 20.

The pattern of the patterned mask 20 in the preferred embodiment is basically an arrangement of slits which form a Cartesian grid. Many such patterns are possible, but the one shown here by example has the advantage that vertical 22 and horizontal 26 integrations of recorded image flux along the image sensor's 50 column and row directions respectively, are not influenced in any significant way by the intersections of otherwise solid gridlines. Also, it should be noted that the patterned mask 20 would not be self-supporting if there were intersections.

For an implementation of the light direction sensor 10 where the Sun is the light source, based on geometry of similar triangles, the position of the ensemble of shadows cast on the image sensor 50 by vertical slit segments 22 and horizontal slit segments 26 on the patterned mask 20 uniquely defines the direction from which sunlight is coming. The patterned mask 20 is constructed such that the image sensor 50 can unambiguously determine truly orthogonal sun azimuth and elevation angles with a single light direction sensor 10 of the present invention.

Azimuthal motion (X) of the Sun with respect to the normal to the light direction sensor 10 causes shadows from all vertical slit segments 22 to move together from column to column on the image sensor 50. While elevation (Y) causes shadows from all horizontal slit segments 26 to move from row to row. Vertical slit segments 22 cast shadows whose integrated brightnesses along pixel columns produce strong peaks while horizontal slit segments 26 cast shadows whose integrated brightnesses along pixel rows likewise produce strong peaks in the orthogonal direction. Cartesian grid intentionally dims the light from some of the slits by alternatively skipping placement of slits in the Cartesian grid.

The column of centering vertical slit segments 24 is the column representing X=0. Note that every other slit segment is missing which gives an easily noticed reduction in peak strength, thereby identifying it as unique. Similarly, the row of centering horizontal slit segments 28 representing Y=0. Along that row, again every other slit segment is missing giving an easily noticed reduction in peak strength, giving that line its uniqueness.

With regard to slit width, wider slits cast a narrower diffraction then slimmer slits. Then, wider slits are better because it allows more closely packed slits and therefore more reading per chip, providing greater sensitivity. However, wider slits let in more light. If the light source is extremely bright, it will cause the image sensor 50 to saturate and provide invalidating measurements. A preferred range for slit width is between 3 μm and 20 μm. In the preferred embodiment, a slit size is on the order of 10 μm.

With regard to slit pitch, closer split spacing gives more readings per detector for greater accuracy. However, the slits cannot be packed so closely spaced that their pattern overlaps. Typically, slit spacings are several hundred micrometers.

With regard to the gap between the patterned mask 20 and image sensor 50, a larger gap provides for larger movement in the diffraction pattern of the light direction sensor 10. Larger gaps give greater sensitivity. However, light from each slit spreads out more as the gap increases, so to keep patterns from overlapping, either the slits must get wider or the spacing must increase. Typical gaps are around 1 mm.

Figure 3A:
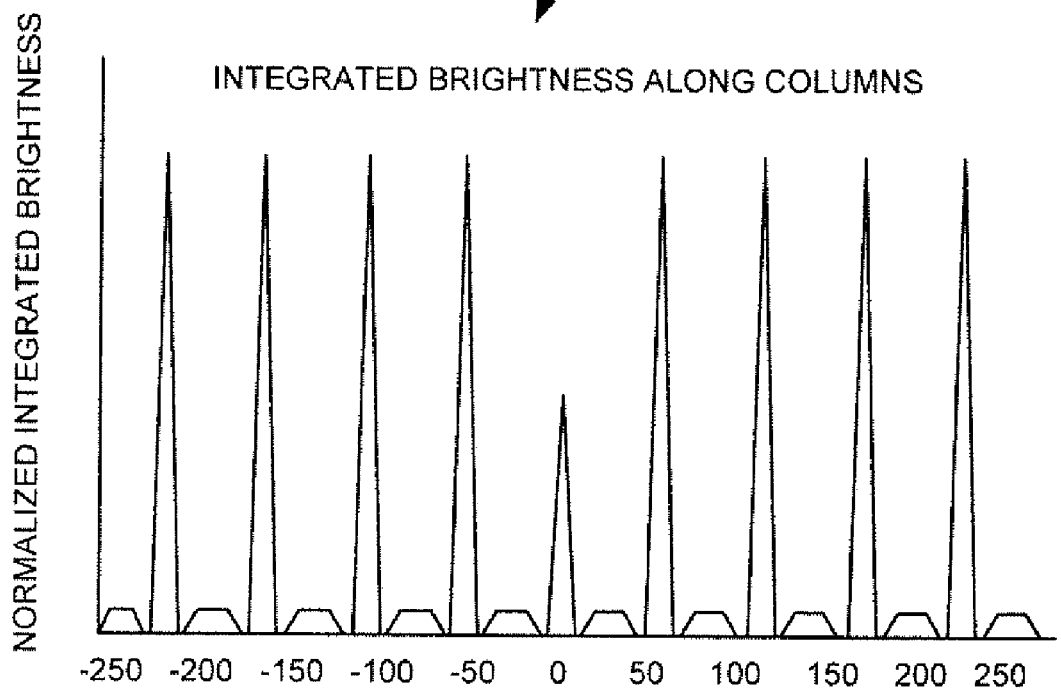
FIGS. 3A & B are examples of integrated brightness a distribution in a column and row coordinates when a light source is parallel to the axis of the light direction sensor of the present invention.

FIGS. 3A & B are examples of integrated brightness distribution in a column and row coordinates when a light source 100 is parallel to the axis of the light direction sensor 10 of the present invention. When the light source 100 is incident parallel to the axis of the light direction sensor 10, the integrated brightness distributions in column and row coordinates of the image sensor 50 will resemble those in FIGS. 3A & 3B.

The shadow of the X=0 segments falls on the center column of the array 80 in FIG. 3A and gives a peak whose characteristic strength is half that of all other vertical peaks.

Figure 3B:
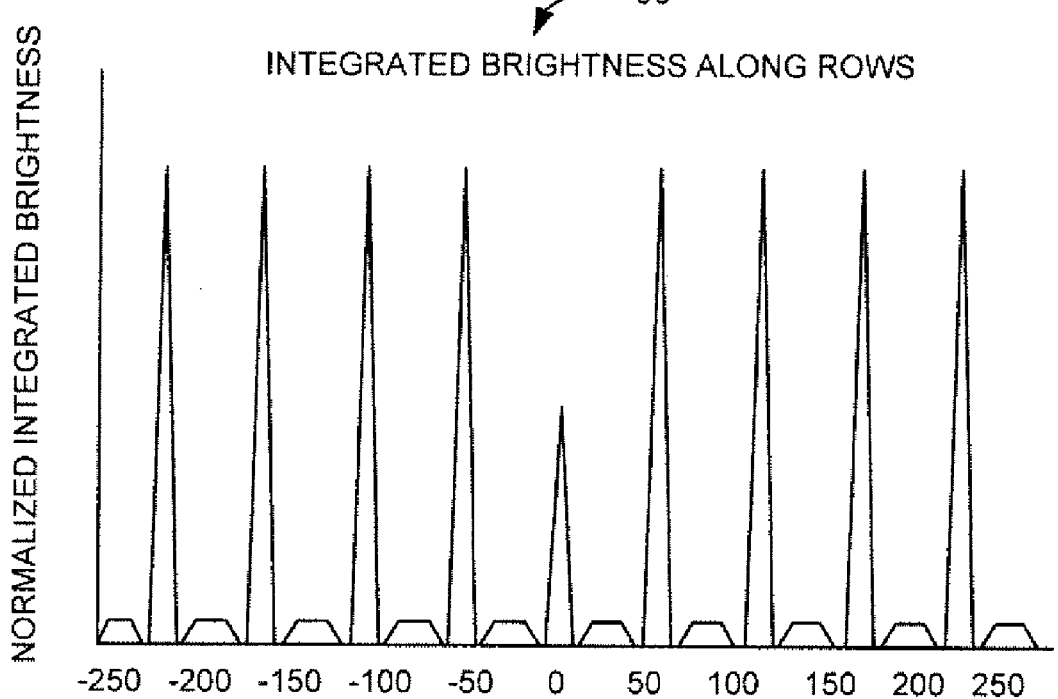

The shadow of the Y=0 segments falls on the center row of the array 90 in FIG. 3B and gives a peak whose characteristic strength is likewise half that of all others. FIGS. 3A-7C illustrates other examples of integrated signals for an image sensor 50 with a 500×500 pixel format. It is understood that image sensor 50 having different pixel format can be utilized.

Figure 4A:
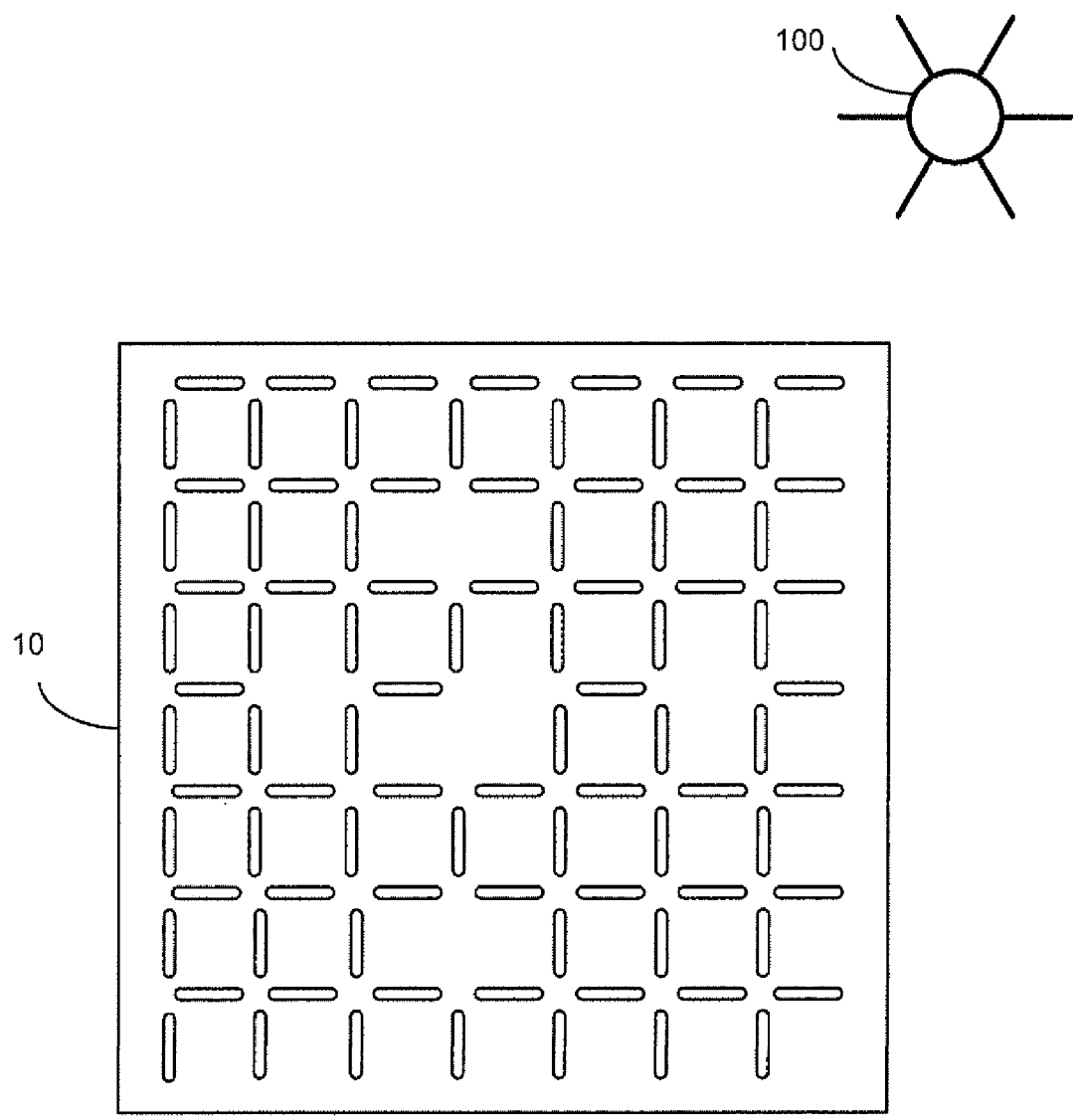
FIG. 4A is an example of the pattern mask with a light source in quadrant one with respect to the light direction sensor of the present invention.
Figure 4B:
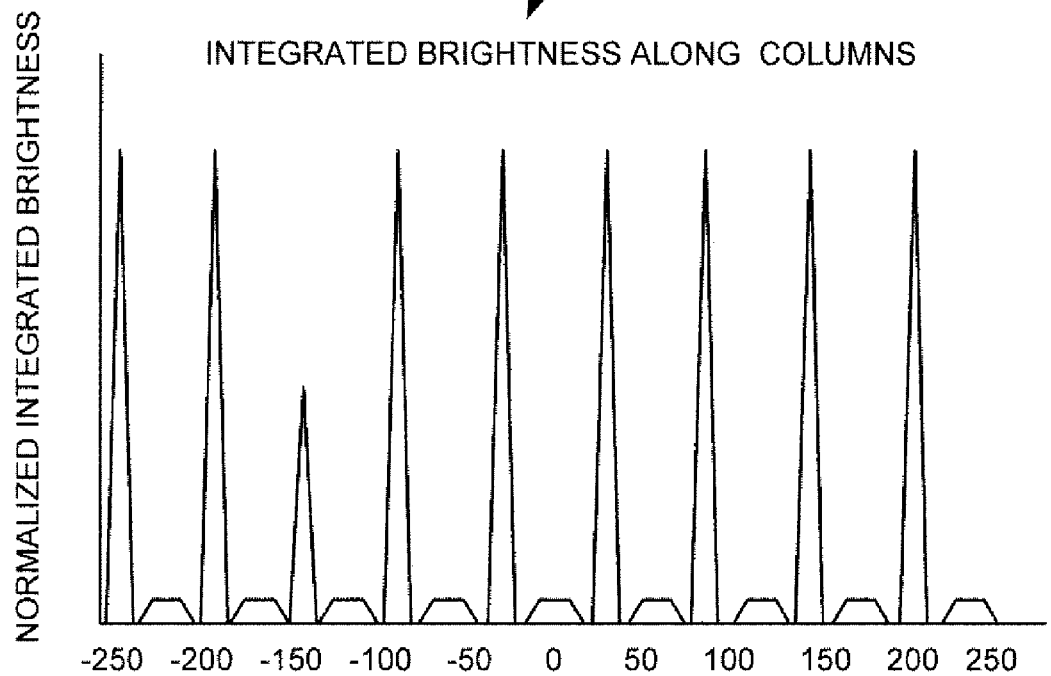
FIGS. 4B & C are examples of integrated brightness distributions in a column and row coordinates when a light source is in quadrant one with respect to the light direction sensor of the present invention.
Figure 4C:
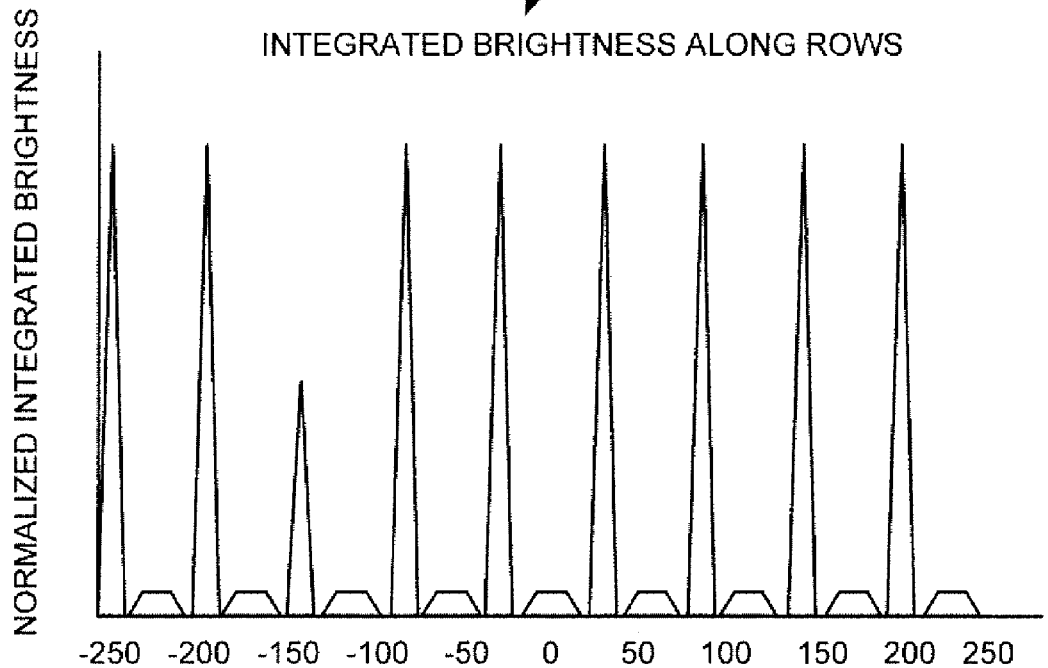

FIGS. 4B & 4C are examples of integrated brightness distributions in a column and row coordinates when a light source 100 is in quadrant one, as shown in FIG. 4A, with respect to the light direction sensor 10 of the present invention. When a light source 100 is coming from quadrant one in relation to the axis of the light direction sensor 10, the integrated brightness distributions in column and row coordinates of the image sensor 50 will resemble those in FIGS. 4B & 4C.

The shadow of the X=0 segments falls to the left of the center column of the array 110 in FIG. 4B and gives a peak whose characteristic strength is half that of all other vertical peaks. The shadow of the Y=0 segments falls to the left of the center column of the array 120 in FIG. 4C and gives a peak whose characteristic strength is likewise half that of all others. The distance of those half strength peaks for the center column indicate the exact position of the light source within the first quadrant.

Figure 5A:
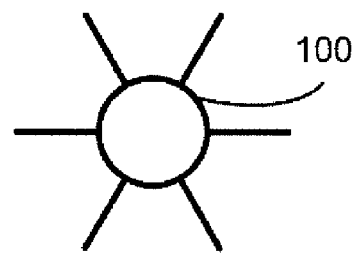
FIG. 5A is an example of the pattern mask with a light source a light source in quadrant two with respect to the light direction sensor of the present invention.
Figure 5A:
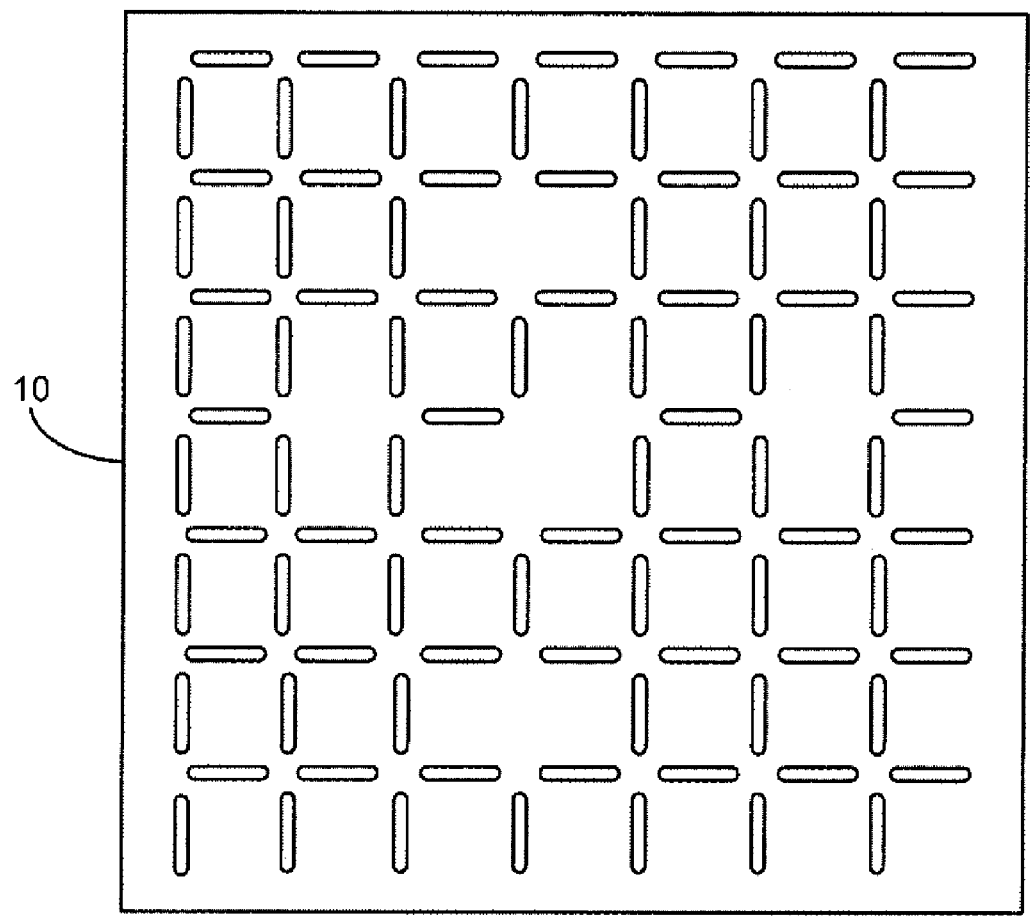
Figure 5B:
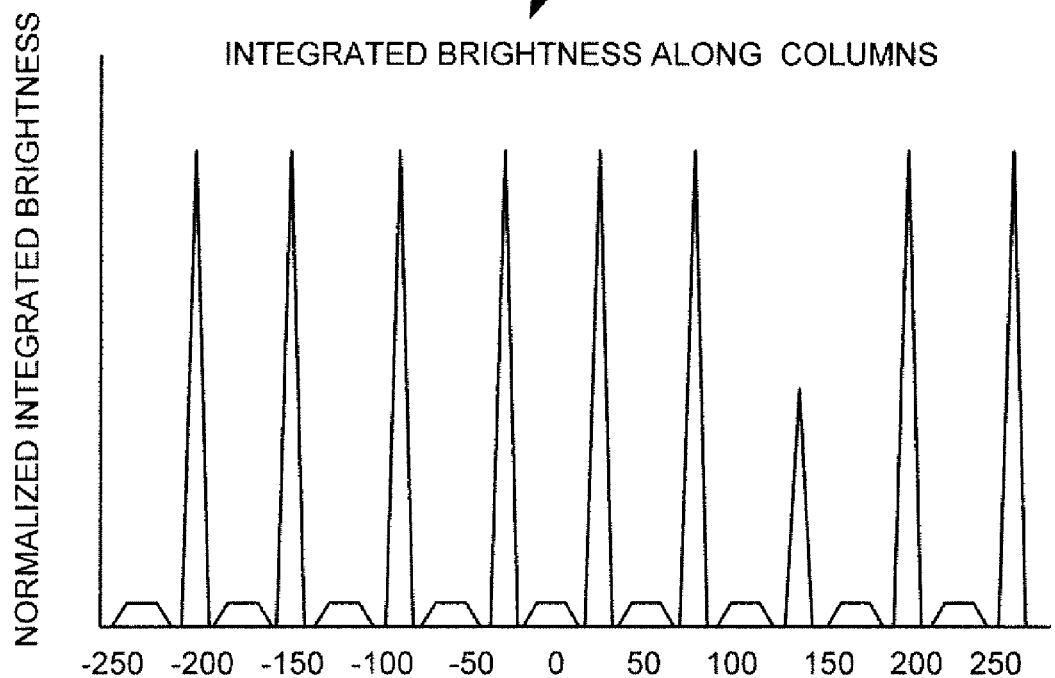
FIGS. 5B & C are examples of integrated brightness distributions in a column and row coordinates when a light source is in quadrant two with respect to the light direction sensor of the present invention.
Figure 5C:
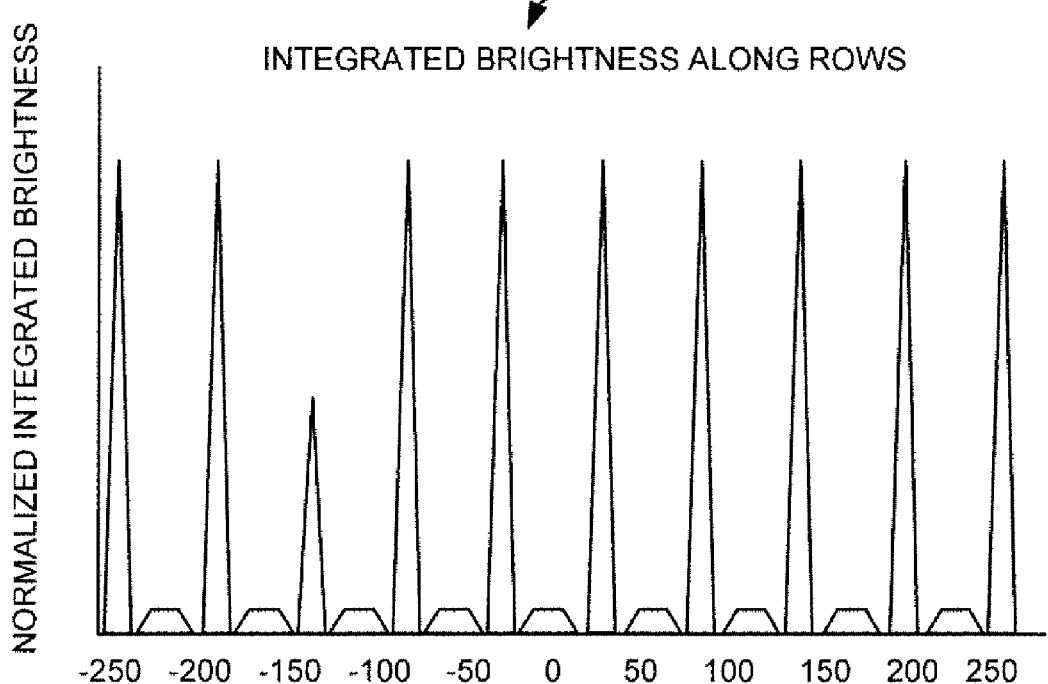

FIGS. 5B & 5C are examples of integrated brightness distributions in a column and row coordinates when a light source is in quadrant two, as shown in FIG. 5A, with respect to the light direction sensor 10 of the present invention. When a light source is coming from quadrant two in relation to the axis of the device, the integrated brightness distributions in column and row coordinates of the image sensor SO will resemble those in FIGS. 5B & 5C.

The shadow of the X=0 segments falls to the right of the center column of the array 130 in FIG. 5B and gives a peak whose characteristic strength is half that of all other vertical peaks. The shadow of the Y=0 segments falls to the left of the center column of the array 140 in FIG. 5C and gives a peak whose characteristic strength is likewise half that of all others.

Figure 6A:
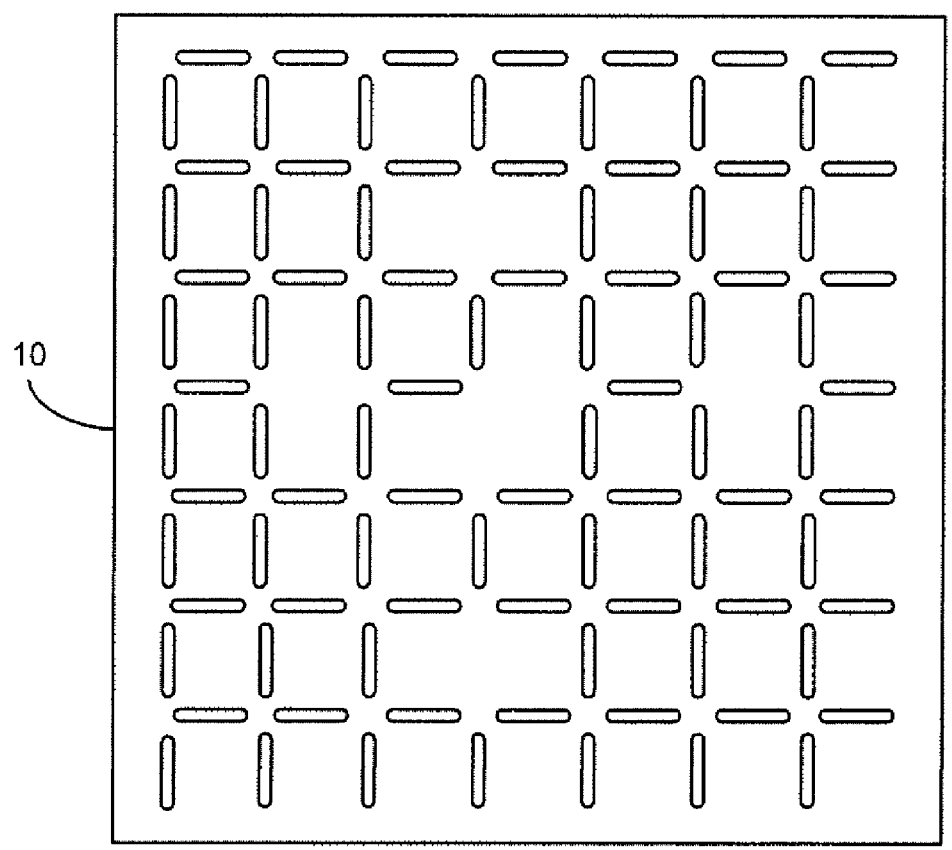
FIG. 6A is an example of the pattern mask with a light source in quadrant three with respect to the light direction sensor of the present invention.
Figure 6A:
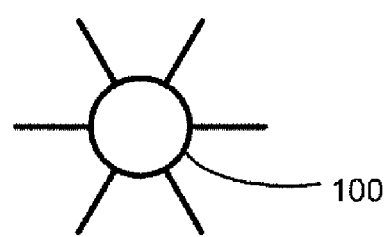
Figure 6B:
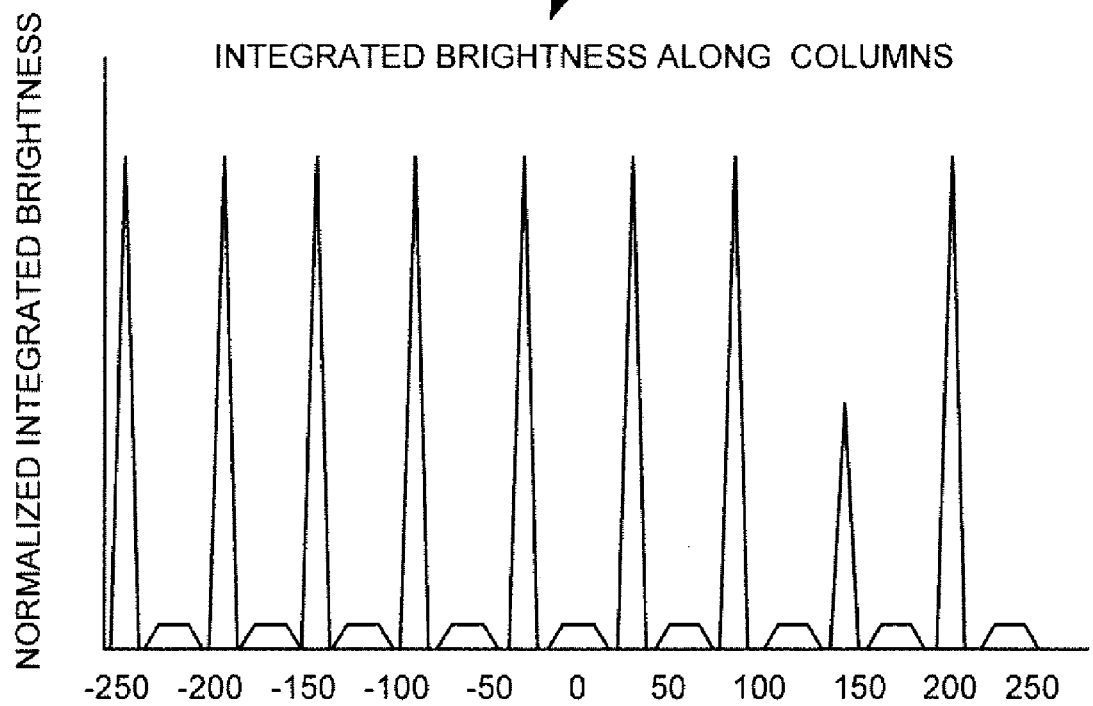
FIGS. 6B & C are examples of integrated brightness distributions in a column and row coordinates when a light source is in quadrant three with respect to the light direction sensor of the present invention.
Figure 6C:
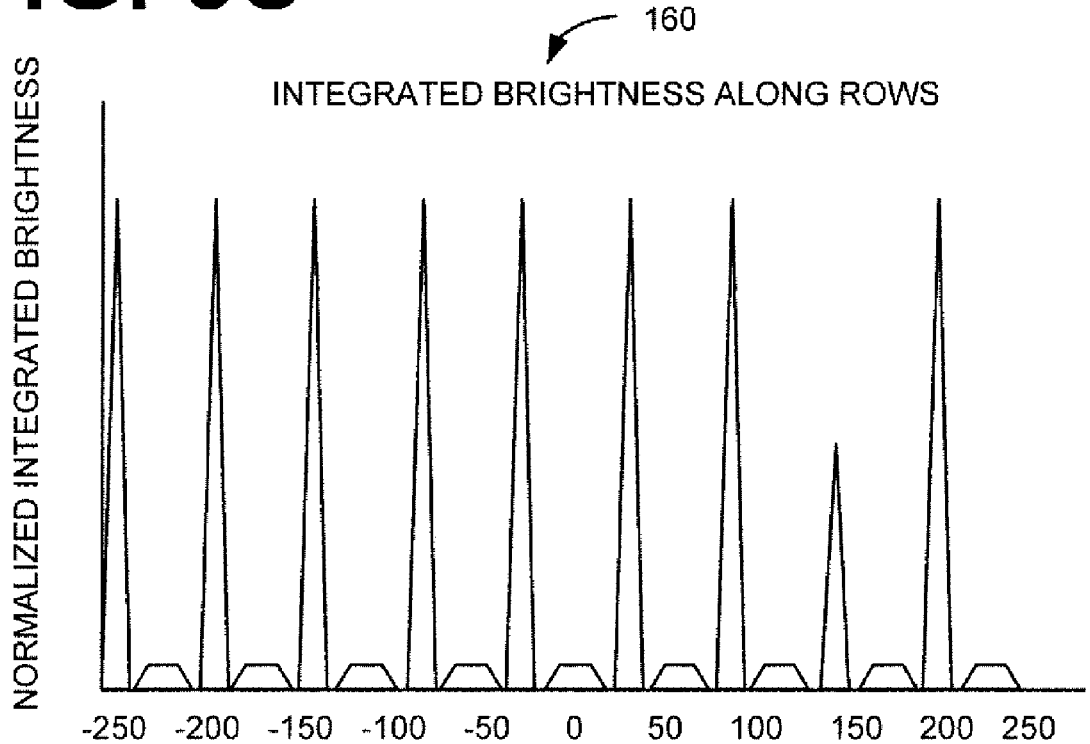

FIGS. 6B & 6C are examples of integrated brightness distributions in a column and row coordinates when a light source is in quadrant two, as shown in FIG. 6A, with respect to the light direction sensor 10 of the present invention. When a light source is coming from quadrant three in relation to the axis of the device, the integrated brightness distributions in column and row coordinates of the image sensor 50 will resemble those in FIGS. 6B & 6C.

The shadow of the X=0 segments falls to the right of the center column of the array 150 in FIG. 6B and gives a peak whose characteristic strength is half that of all other vertical peaks. The shadow of the Y=0 segments falls to the right of the center column of the array 160 in FIG. 6C and gives a peak whose characteristic strength is likewise half that of all others.

Figure 7A:
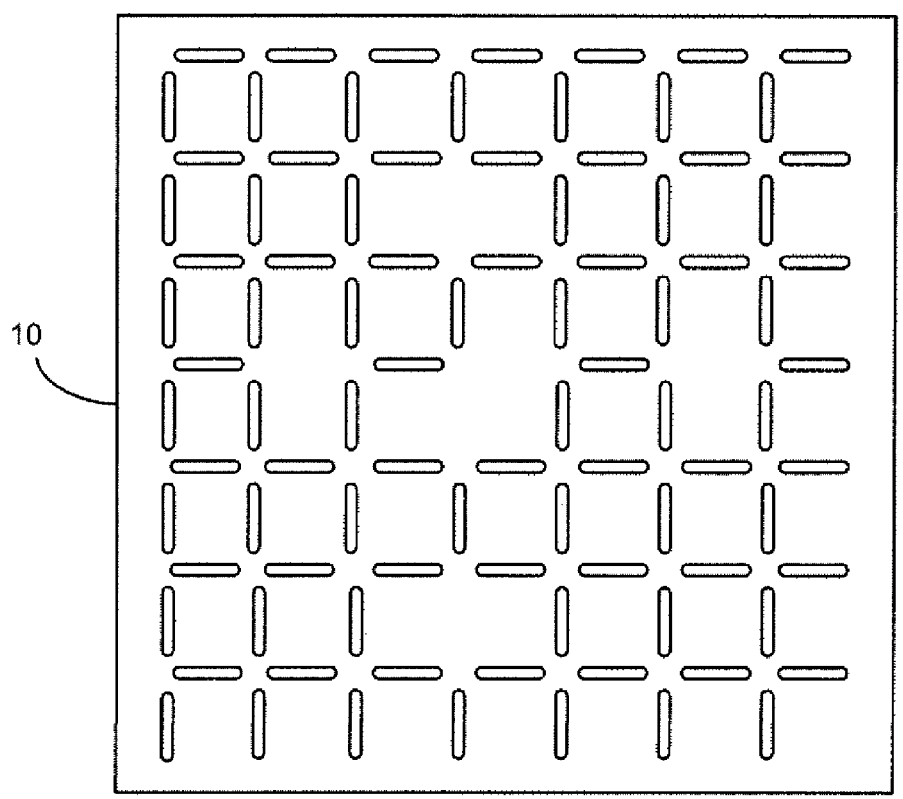
FIG. 7A is an example of the pattern mask with a light source in quadrant four with respect to the light direction sensor of the present invention.
Figure 7A:
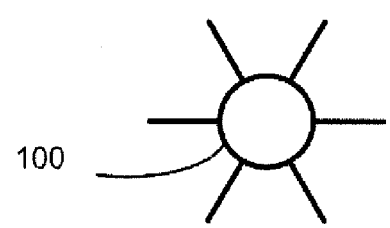
Figure 7B:
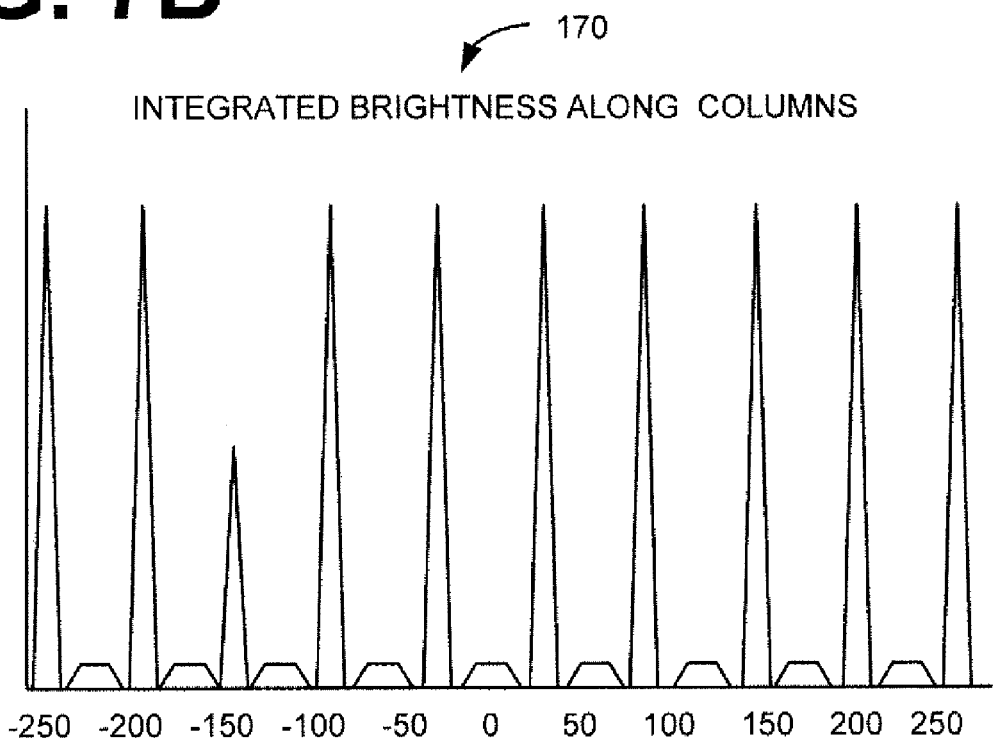
FIGS. 7B & C are examples of integrated brightness distributions in a column and row coordinates when a light source is in quadrant four with respect to the light direction sensor of the present invention.
Figure 7C:
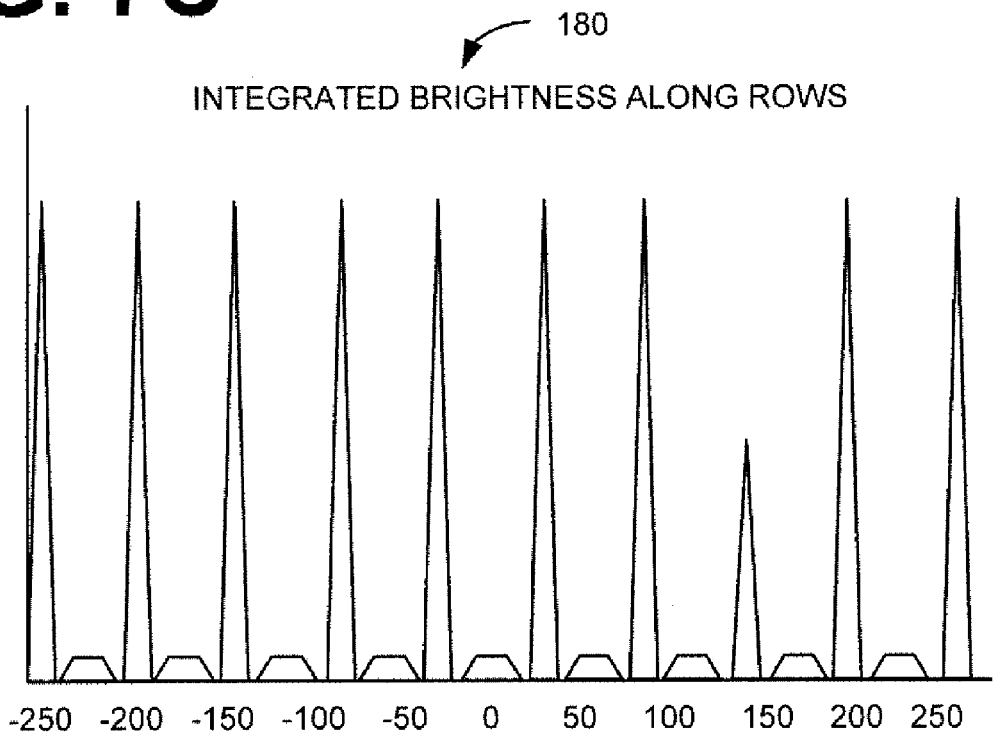

FIGS. 7B & 7C are examples of integrated brightness distributions in a column and row coordinates when a light source is in quadrant four, as shown in FIG. 7A, with respect to the light direction sensor 10 of the present invention. When a light source is coming from quadrant four in relation to the axis of the device, the integrated brightness distributions in column and row coordinates of the image sensor 50 will resemble those in FIGS. 7B & 7C.

The shadow of the X=0 segments falls to the left of the center column of the array 170 in FIG. 73 and gives a peak whose characteristic strength is half that of all other vertical peaks. The shadow of the Y=0 segments falls to the right of the center column of the array 180 in FIG. 7C and gives a peak whose characteristic strength is likewise half that of all others.

Figure 8:
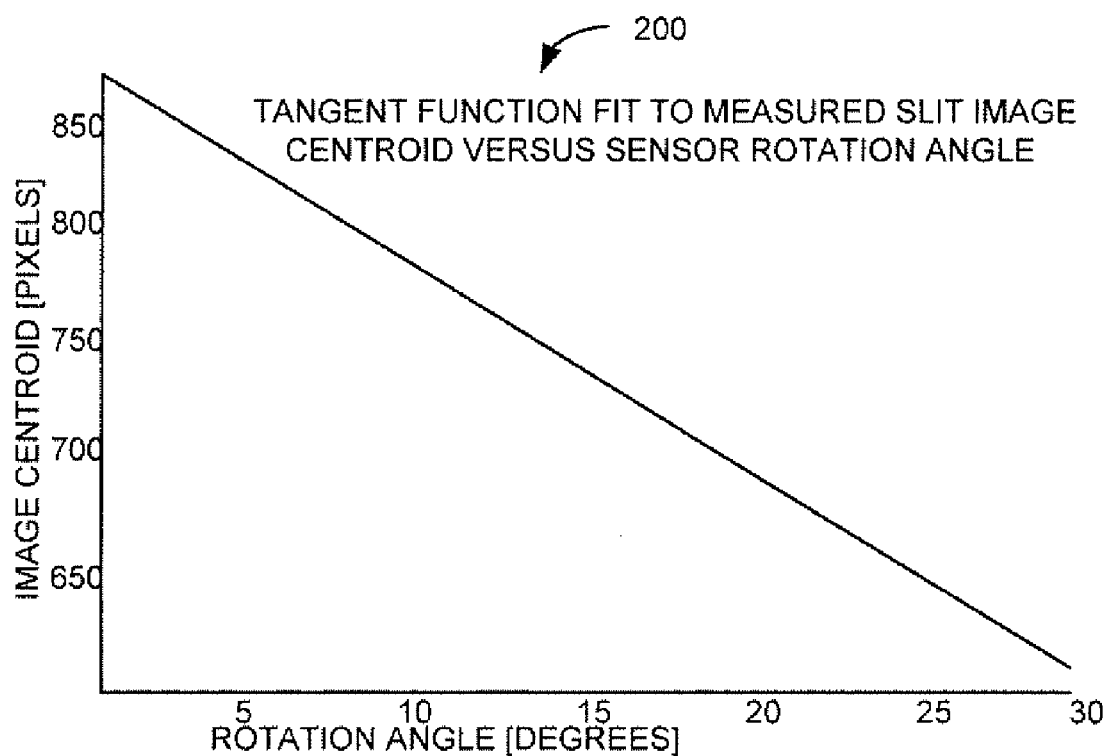
FIG. 8 is an example of a diagram that illustrates be measured centroid positions fit to a tangent function over a range of 30° from normal to the light direction sensor as shown in FIG. 1.

FIG. 8 is an example of a diagram 200 that illustrates the measured centroid positions fit to a tangent function over a range of 30° from normal to the light direction sensor 10 as shown in FIG. 1. A solar disc projector was set up to illuminate only a single slit in front of the image sensor 50 in the light direction sensor 10. The projector consisted of a liquid light guide fed by a commercial fiber optic illuminator containing a 150 W quartz tungsten halogen (QTH) lamp. The output of the liquid light guide illuminates an off-axis parabolic collimating mirror whose focal length was selected so that the apparent angular subsense of the light guide as seen in collimated space was the same as the Sun's subsense in the sky~0.5 degrees. The image sensor 50 was mounted on a manual rotation stage whose vernier limited accuracy of angular settings to +/−0.1 degree.

The intent of this is to demonstrate a) finding a practical slit width and spacing between a slit and image sensor 50 which would result in an image distribution which was easily analytically tractable, b) and verifying the expected functional relationship between sensor rotation angle and measured slit image centroid position on the image sensor 50 (a tangent function with an appropriate scale factor based on the separation between the slit and the image sensor).

It should be emphasized that the above-described embodiments of the present invention, particularly, any "exemplary" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A light direction sensor, comprising: a image sensor; a spacer attached to said image sensor; and a pattern mask having a plurality of slits, and is attached to said spacer, wherein said pattern mask has a slit pattern that as light passes through the slit pattern the light casts a diffraction pattern onto the image sensor with said slit pattern further comprising an arrangement of slits which form a Cartesian grid that intentionally dims the light from some of the slits by alternatively skipping placement of slits in the Cartesian grid.

2. The light direction sensor of claim 1, further comprising an interface substrate.

3. The light direction sensor of claim 1, wherein said pattern mask is a perforated metal foil.

4. The light direction sensor of claim 1, wherein said slits has a width in a range between 3 and 20 µm.

5. The light direction sensor of claim 4, wherein said slits have the width that is approximately 10 µm.

6. The light direction sensor of claim 1, wherein said slits have spacing between the slits in the range of 100 to 800 µm.

7. The light direction sensor of claim 1, wherein said spacing provides a gap between said image sensor and said pattern mask in the range of 1 to 10 mm.

8. The light direction sensor of claim 1, wherein said slits are arranged such that the patterns they produce on said image sensor do not interfere with each other.

9. A method for determining the direction of a light source, comprising: receiving a beam of light onto a patterned mask, wherein said patterned mask has a plurality of slit segments; diffusing the beam of light onto a image sensor; and determining the direction of the light source; wherein the plurality of slit segments on said patterned mask are in a Cartesian grid which intentionally dims the light from some of the slits by alternatively skipping placement of some of the slits in the Cartesian grid.

10. The method of claim 9, wherein the determining step further comprising computing the direction of the light source based on geometry of similar triangles.

11. The method of claim 9, wherein said slit segments are arranged such that the patterns they produce on said image sensor do not influence each other.

* * * * *